US012784121B2

(12) United States Patent
Li et al.

(10) Patent No.: US 12,784,121 B2
(45) Date of Patent: Nov. 3, 2026

(54) METHOD AND SYSTEM FOR ANALYZING THE PROPAGATION PATH OF DAM SAFETY HAZARDS BASED ON A KNOWLEDGE GRAPH

(71) Applicants: Changjiang Spatial Information Technology Engineering Co., Ltd. (Wuhan), Wuhan (CN); Huazhong University of Science and Technology, Wuhan (CN)

(72) Inventors: Shuangping Li, Wuhan (CN); Bin Zhang, Wuhan (CN); Junxing Zheng, Wuhan (CN); Zuqiang Liu, Wuhan (CN); Lin Gao, Wuhan (CN); Huabei Liu, Wuhan (CN); Dong Wang, Wuhan (CN); Xin Zhang, Wuhan (CN); Bo Shi, Wuhan (CN); Yonghua Li, Wuhan (CN); Huawei Wang, Wuhan (CN)

( * ) Notice: Subject to any disclaimer, the term of this patent is extended or adjusted under 35 U.S.C. 154(b) by 0 days.

(21) Appl. No.: 19/336,993

(22) Filed: Sep. 23, 2025

(65) Prior Publication Data

US 2026/0245163 A1 Aug. 20, 2026

(30) Foreign Application Priority Data

Feb. 14, 2025 (CN) ........................ 202510162572.8

(51) Int. Cl.
*G06Q 50/26* (2024.01)
*G06N 5/022* (2023.01)

(52) U.S. Cl.
CPC ........... *G06Q 50/265* (2013.01); *G06N 5/022* (2013.01)

(58) Field of Classification Search
CPC ........ G06Q 50/26; G06Q 50/08; G06Q 10/20; G06N 5/022
See application file for complete search history.

(56) References Cited

U.S. PATENT DOCUMENTS

2017/0270124 A1* 9/2017 Nagano ............. G06F 16/24575
2021/0192639 A1* 6/2021 Dalal ....................... G06N 3/02
(Continued)

FOREIGN PATENT DOCUMENTS

CN 119646952 B * 5/2025

OTHER PUBLICATIONS

Khan et al, "A Critical Review of IOT-based Structural Health Monitoring for Dams" (2025), IEEE Internet of Things Journal, vol. 12, No. 2, 15, published Jan. 2025 (Year: 2025).*
(Continued)

*Primary Examiner* — Andrew Chase Lakhani

(57) ABSTRACT

A method and system for analyzing the propagation path of dam safety hazards based on a knowledge graph includes the following steps: based on the dam's historical operating status data, externally acquired information resources related to dam safety, and engineering and technical documents formed during the planning, design, construction, and operation phases of the dam, conduct a historical safety hazard assessment of the dam to identify historical hazards and their characteristics; construct a knowledge graph based on the results of the historical safety hazard assessment, and represent the dam's structural units, historical hazards, and their relationships in the form of nodes and edges; based on the dam's real-time operating status data, update the node attributes and relationships of the knowledge graph, and use the updated knowledge graph to analyze the propagation path of the dam's safety hazards. The invention achieves comprehensiveness and accuracy in dam hazard analysis.

8 Claims, 4 Drawing Sheets

(56) References Cited

U.S. PATENT DOCUMENTS

| | | | | |
|---|---|---|---|---|
| 2022/0130145 | A1* | 4/2022 | Connary | G05D 1/101 |
| 2022/0382234 | A1* | 12/2022 | Aleksy | G06Q 50/08 |
| 2023/0115475 | A1* | 4/2023 | Alsumail | G06N 3/084<br>700/79 |
| 2023/0394605 | A1* | 12/2023 | Man | G06N 5/02 |
| 2025/0245391 | A1* | 7/2025 | Chen | G06F 30/13 |

OTHER PUBLICATIONS

Liu "Research on Real-Time Crack Monitoring at Early Warning System for Rockfill Dams based on the Internet of Things", 2025 7th International Conference on Artificial Intelligence Technologies and Applications, accessed Jul. 22, 2026 (2025) (Year: 2025).*

* cited by examiner

METHOD AND SYSTEM FOR ANALYZING THE PROPAGATION PATH OF DAM SAFETY HAZARDS BASED ON A KNOWLEDGE GRAPH

TECHNICAL FIELD

The invention relates to the technical field of dam safety monitoring, and specifically relates to a method and system for analyzing the propagation path of dam safety hazards based on a knowledge graph.

BACKGROUND ART

As crucial water conservancy engineering facilities, the safety of dams is directly related to the safety of life and property of residents in downstream areas as well as the stability of the ecological environment. However, with the extension of dams' service life, changes in the external environment (such as climate change and natural disasters) are becoming increasingly severe, putting forward higher requirements for dam safety monitoring. The existing dam monitoring and hazard assessment technologies face the following major technical problems in practical applications:

1. Single Data Source and Isolated Information

Current dam safety monitoring systems mostly rely on single-modal sensor data, such as strain sensors, vibration sensors, or environmental monitoring sensors. Although this data can reflect the local operating status, it cannot provide comprehensive hazard identification and risk assessment. For example, strain sensors can detect structural deformation, but it is difficult for them to reflect the comprehensive impact of temperature changes on structural stress. The isolation of different data sources makes it difficult for existing systems to conduct hazard analysis from a global perspective.

2. Lack of Dynamic Correlation Analysis and Propagation Path Modeling

In prior art, the assessment and analysis of dam hazards are usually based on static data and fixed model methods. This approach cannot capture the dynamic propagation characteristics of hazards in the dam structure. For instance, when a hazard occurs in a certain dam body unit, the impact path and propagation speed of the hazard on surrounding units cannot be effectively modeled through traditional methods. In addition, the impact range and propagation risk of hazards fail to be quantified and expressed in the overall structure, making it difficult for managers to accurately identify potential key nodes and hazard propagation chains.

3. Insufficient Comprehensive Utilization of Historical Data and External Information Resources A large amount of historical operating status data, hazard records, design and construction documents, etc., are accumulated during the operation of dams. This data has important reference value for hazard assessment, but existing systems usually lack effective tools and means for comprehensive analysis. Moreover, external resources related to dam safety (such as academic research, technical standards, patent data, and accident cases) can provide important cutting-edge reference information, but the ability to dynamically acquire and integrate this data remains absent in prior art. This insufficient utilization of historical and external data limits the intelligence level of existing hazard analysis systems.

4. Inadequate Structured and Dynamic Data Management Capabilities

As a complex engineering system, there are complex physical connections and mechanical relationships between various structural units of a dam. However, existing systems lack efficient tools that can express these relationships. At the same time, there is a lack of unified expression and correlation modeling capabilities between real-time monitoring data, historical data, and external data, making it difficult to tap into and utilize the potential value of the data. Especially when the external environment and real-time data change, the system cannot dynamically update the hazard assessment model to adapt to the new operating status.

SUMMARY OF THE INVENTION

The purpose of this invention is to address the shortcomings existing in the above-mentioned background art, and provide a method and system for analyzing the propagation path of dam safety hazards based on a knowledge graph, so as to achieve comprehensiveness and accuracy in hazard analysis.

The technical solution adopted by the invention is: a method for analyzing the propagation path of dam safety hazards based on a knowledge graph according to the invention includes the following steps:

Based on the dam's historical operating status data, externally acquired information resources related to dam safety, and engineering and technical documents formed during the planning, design, construction, and operation phases of the dam, conduct a historical safety hazard assessment of the dam to identify historical hazards and their characteristics;

Construct a knowledge graph based on the results of the historical safety hazard assessment, and represent the dam's structural units, historical hazards, and their relationships in the form of nodes and edges;

Based on the dam's real-time operating status data, update the node attributes and relationships of the knowledge graph, and use the updated knowledge graph to analyze the propagation path of the dam's safety hazards.

In the above technical solution, the historical operating status data and real-time operating status data of the dam include, but are not limited to, the data collected by physical quantity sensors, vibration sensors, visual sensors, audio sensors and environmental sensors deployed on the dam.

In the above technical solution, the information resources include: news reports, academic papers, patent data, technical standards, specifications and laws and regulations related to dam safety.

In the above technical solution, the historical and real-time operating status data of the dam are preprocessed before being used in subsequent steps; the preprocessing process includes: using a standardization formula for various data sensors to eliminate dimensional differences, and aligning the timestamps of data from different sensors; fusing the data from different sensors according to a certain weight; and dynamically adjusting the weight based on the sensor error during the fusion process.

In the above technical solution, the process of acquiring external information resources related to dam safety includes: obtaining a large amount of external resource data through web search and data crawling; establishing inverted indexes and B+ tree indexes for the external resource data; using indexing and parallel query technology to retrieve the external resource data to find target data; caching data sources and query results with high access frequency; and performing weighted fusion of the target data and dam operating status data, with weights dynamically adjusted according to data characteristics, to form a comprehensive information resource dataset.

In the above technical solution, the engineering and technical documents formed during the planning, design, construction, and operation phases of the dam are preprocessed before being used in subsequent steps; the preprocessing process includes: constructing a knowledge document library based on engineering and technical documents formed during the planning, design, construction, and operation phases of the dam; divides long documents in the knowledge document library into text chunks; uses a text embedding model to convert the text chunks into digital vectors, captures the semantic information of the text, and forms a vector database; the vector database is used to retrieve text chunks related to queries and provide the most relevant information.

In the above technical solution, the process of conducting a historical safety hazard assessment on the dam and identifying historical hazards and their characteristics includes:

Constructing and updating a BIM model: based on engineering and technical documents, construct a BIM model of the dam based on engineering and technical documents, and extracts attribute data from it to assign to each structural unit; associates historical operating status data, maintenance records, stress history, and other information with the corresponding parts of the BIM model; integrates the latest technical standards, specifications, laws, regulations, accident cases, and academic research into the BIM model based on externally acquired information resources, and updates risk assessment parameters and hazard identification models;

Identifying historical hazards using the BIM model: uses the geometric and material information of the BIM model to conduct finite element analysis, fluid mechanics analysis, heat conduction analysis, and soil mechanics analysis, simulates the response of the dam under various working conditions, and identifies potential hazard areas and their characteristics. These include stress concentration areas, areas that may be subjected to excessive water pressure or erosion, areas that may develop cracks due to excessive thermal stress, and foundation areas that may experience settlement or landslides;

Hazard verification and risk assessment: compares the identified hazard areas with historical operating status data and historical hazard records in engineering and technical documents to verify the accuracy of the model analysis results; classifies the identified historical hazards into risk levels based on the characteristics of historical hazards;

Visualization and model update: highlights the identified hazard areas in the BIM model and labels the hazard characteristics; continuously updates the BIM model and various analysis models as new operating data and information resources are acquired.

In the above technical solution, the process of constructing and updating the knowledge graph and analyzing the propagation path of the dam's safety hazards includes:

Definition and attribute assignment of nodes and edges: defines each structural unit of the dam as a structural unit node and assigns attributes to it; the node attributes include: basic physical information, historical hazard records, detection data, and maintenance logs; defines the physical connections and mechanical relationships between nodes as structural connection edges and assigns attributes to them;

Establish the correlation between nodes and edges: establish edges between nodes based on historical operating status data, engineering and technical documents, and geometric information in the BIM model;

Data storage and connectivity calculation: store the information of nodes and edges in the graph database; calculate the nodes and edges in the graph database to obtain the connectivity and importance score of the nodes;

Knowledge graph update: based on the real-time collected dam operating status data and new external information resources, update the health status and risk level of nodes in the knowledge graph, as well as the weight and impact probability of edges;

Hazard propagation analysis and update: use the updated node and edge attributes and the results of connectivity calculation to analyze the path and probability of hazards propagating from one structural unit to another;

Constructing hazard impact matrix and identifying key nodes: based on the hazard propagation probability, construct a matrix representing the hazard correlation between nodes; combine the hazard impact matrix and the graph database to calculate the shortest path of hazards from the source node to other nodes; identify nodes that have an important impact on the hazard propagation process based on the importance score of the nodes and their role in the hazard propagation process.

The invention provides a system for analyzing the propagation path of dam safety hazards based on a knowledge graph, including: a historical hazard identification module, a knowledge graph construction module, and a hazard propagation path analysis module;

The historical hazard identification module is used to conduct a historical safety hazard assessment on the dam and identify historical hazards and their characteristics based on the historical operating status data of the dam, externally acquired information resources related to dam safety, and engineering and technical documents formed during the planning, design, construction, and operation phases of the dam;

The knowledge graph construction module is used to construct a knowledge graph based on the historical safety hazard assessment results, and represent the structural units, historical hazards of the dam and their relationships in the form of nodes and edges;

The hazard propagation path analysis module is used to update the node attributes and relationships of the knowledge graph based on the real-time operating status data of the dam, and analyze the safety hazard propagation path of the dam using the updated knowledge graph;

The invention provides a computer-readable storage medium, on which a computer program is stored, and when the computer program is executed by a processor, a method for analyzing the propagation path of dam safety hazards based on a knowledge graph described in the above technical solution is implemented;

The beneficial effects of the invention are: the method steps in the invention form a closed-loop information flow and feedback mechanism. Basic data is provided through the collection of dam operating status data, external information calculation data enriches the information source, engineering and technical documents provide support for the historical background, and through in-depth analysis of the above data, a knowledge graph is constructed to analyze potential hazard propagation. The invention converts complex data into understandable information, integrates all information to form a comprehensive risk assessment, and provides scientific decision support for dam management;

Further, the invention covers various aspects of dam operating status information through data collected by multiple sensors (such as physical quantity sensors, vibration sensors, visual sensors, etc.), enhancing the comprehensiveness of monitoring. The invention provides high-quality data input for subsequent hazard assessment and knowledge graph construction, improving the accuracy and reliability of analysis results;

Further, the invention dynamically introduces external information resources related to dam safety (such as technical standards, specifications, patent data, etc.), expanding the perspective of hazard analysis. The invention improves the adaptability of the knowledge graph to new hazard patterns, helps to continuously update the hazard analysis model, and enhances the forward-looking of the technical solution;

Further, the invention proposes specific data preprocessing methods (such as eliminating dimensional differences, time alignment, and dynamic weight adjustment), improving the fusion quality of multi-source data. Dynamically adjusting data weights can enhance the system's adaptability to different data qualities and reduce analysis deviations caused by noise or errors;

Further, the invention improves the retrieval efficiency of external information resources by establishing inverted indexes and B+ tree indexes, and using parallel query technology; realizes the caching and dynamic fusion of high-frequency access data, effectively reducing the time cost of obtaining external data, while ensuring the freshness of data and the accuracy of analysis results;

Further, the invention effectively improves the efficiency and accuracy of large-scale document processing through the long-document processing of engineering and technical documents (such as dividing into text chunks and vectorized representation); constructs a knowledge document library and a vector database, providing efficient data query support for subsequent hazard analysis and knowledge graph construction;

Further, the invention integrates the geometric information, material properties, and historical records of the dam through a hazard assessment method based on the BIM model, providing accurate basic data for hazard analysis; using multiple models such as finite element analysis and fluid mechanics analysis, it can identify potential hazard areas in multiple dimensions, enhancing the comprehensiveness and accuracy of hazard identification; hazard verification, risk grading, and visualization methods improve the intuitiveness and credibility of hazard assessment, providing clear decision support for dam management;

Further, the invention realizes the comprehensive modeling of structural units, hazard events, and propagation paths through the definition and attribute assignment of nodes and edges; constructing a hazard propagation matrix and dynamically updating the knowledge graph can identify hazard propagation paths and key nodes, providing an accurate basis for prevention and control measures; the data storage and connectivity calculation methods further improve the analysis efficiency and provide technical support for subsequent propagation path analysis;

Further, through modular design, the invention independently implements historical hazard identification, knowledge graph construction, and hazard propagation path analysis, enhancing the flexibility and scalability of the system. The hazard propagation path analysis module can dynamically respond to changes in real-time data, improving the timeliness and dynamics of hazard analysis. The structured system design enhances the implementability of the overall solution and provides an intelligent tool for dam safety management.

BRIEF DESCRIPTION OF ACCOMPANY DRAWINGS

SPECIFIC EMBODIMENT OF THE INVENTION

The invention will be further described in detail below with reference to the accompanying drawings and specific embodiments to facilitate a clear understanding of the invention, but they do not limit the invention.

Figure 1:
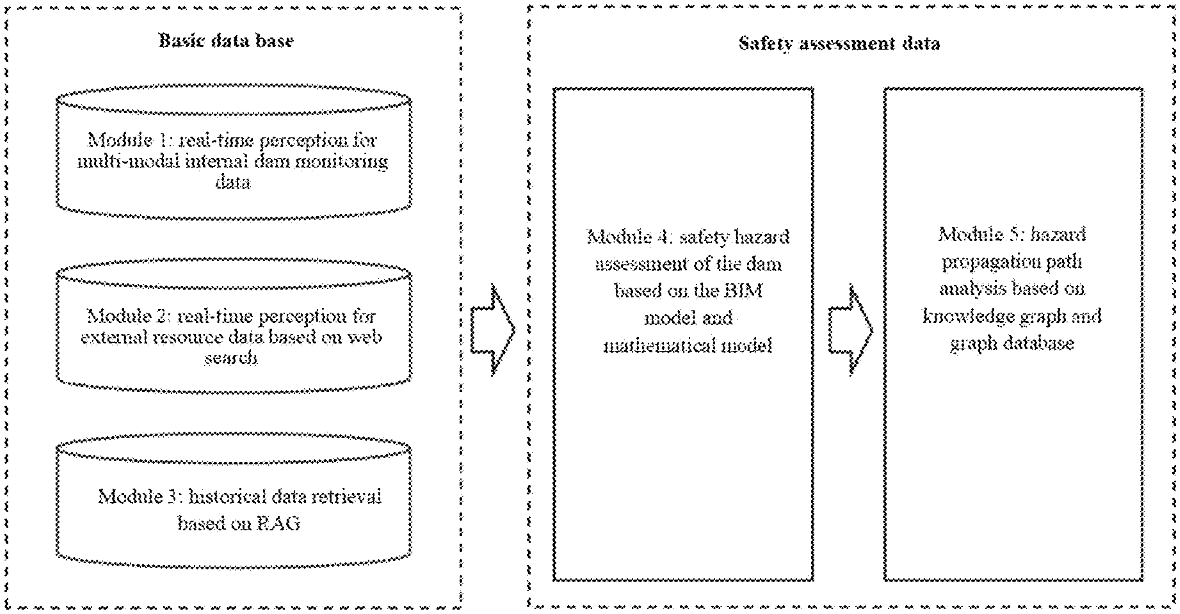
FIG. 1 is a diagram of the overall architecture of the invention.

As shown in FIG. 1, a method for analyzing the propagation path of dam safety hazards based on a knowledge graph according to the invention includes the following steps:

Based on the dam's historical operating status data, externally acquired information resources related to dam safety, and engineering and technical documents formed during the planning, design, construction, and operation phases of the dam, conduct a historical safety hazard assessment of the dam to identify historical hazards and their characteristics;

Construct a knowledge graph based on the results of the historical safety hazard assessment, and represent the dam's structural units, historical hazards, and their relationships in the form of nodes and edges;

Based on the dam's real-time operating status data, update the node attributes and relationships of the knowledge graph, and use the updated knowledge graph to analyze the propagation path of the dam's safety hazards.

The principle of the invention will be further explained below in conjunction with specific embodiments.

As shown in FIG. 1, a dam safety monitoring and assessment system based on a multi-modal large model according to the invention includes the following modules:

Module 1: real-time perception module for multi-modal internal dam monitoring data, used for collecting and processing multi-modal internal dam monitoring data, acquiring real-time and historical operating status data, and generating a comprehensive real-time monitoring view of the dam's health status.

The monitoring data includes physical quantities (deformation, seepage, stress-strain, temperature, etc.), images (photos, videos, point clouds, etc.), vibrations (strong earthquake monitoring, etc.), audio frequencies (metal structure monitoring), and environmental data (meteorology, earthquakes, hydrology, etc.).

The real-time monitoring view of the dam's health status is a data visualization interface that comprehensively displays the current safety status and structural health of the dam. The real-time monitoring view of the dam's health status displays the following data:

Overview of real-time data: displays various real-time monitoring data of the dam, including physical quantities such as stress, displacement, temperature, and seepage.

Status indicators: health indicators calculated from various monitoring data, such as safety factors and risk levels, which help to quickly judge the overall health status of the dam.

Anomaly detection: real-time display of abnormal data or early warning signals detected by sensors, helping managers to identify potential safety hazards in a timely manner.

Visual charts: intuitively display data change trends using graphs, charts, etc., such as stress change curves and displacement distribution maps, to facilitate the identification of abnormal patterns. Regional heat maps: display the health status of different parts of the dam through heat maps, wherein the depth of color represents different risk levels or the degree of abnormality in monitoring data.

Historical comparison: provide comparisons of historical monitoring data to help analyze changes between the current status and past statuses, and identify long-term trends and potential problems.

By integrating this information, the real-time monitoring view of the dam's health status provides managers with a clear and intuitive tool to help them make rapid and scientific decisions and ensure the safe operation of the dam.

Module 2: real-time perception module for external resource data based on web search, used to acquire information resources related to dam safety worldwide through automated web crawler technology.

Specifically, a large amount of external resource data is obtained through web search and data crawling; inverted indexes and B+ tree indexes are established for the external resource data; the indexes and parallel query technology are used to retrieve the external resource data to find target data; data sources and query results with high access frequency are cached; the target data and dam operating status data are weighted and fused, and the weights are dynamically adjusted according to data characteristics to form a comprehensive information resource dataset.

The information resources related to dam safety include global news reports on reservoir dam monitoring, safety assessment, monitoring and early warning, and maintenance and reinforcement, as well as the latest scientific and technological resources such as academic papers, patents, laws, regulations, and standards. These data are combined with multi-modal sensor data to enhance the ability to assess the overall safety status of the dam. The introduction of external resource data improves the comprehensiveness of decision-making and provides rich background information and reference basis for subsequent analysis modules.

Module 3: historical data retrieval module based on RAG. It constructs a knowledge document library based on engineering and technical documents formed during the planning, design, construction, and operation phases of the dam; divides long documents in the knowledge document library into text chunks; uses a text embedding model to convert the text chunks into digital vectors, captures the semantic information of the text, and forms a vector database; the vector database is used to retrieve text chunks related to queries and provide the most relevant information.

The dam knowledge document library covers various important data types such as survey and design data, construction records, daily dam operation data, hazard records, log records, operation and maintenance records of hydraulic gates and hydro-turbine units, and dam maintenance and reinforcement records, including detailed information on all aspects of dam construction, operation, maintenance, and repair.

To ensure that this information can be retrieved and used efficiently and accurately, Module 3 first uses embedding technology to vectorize historical data, converting text information into digital vectors to facilitate subsequent calculation and comparison. This vectorized representation not only retains the semantic information of the data but also improves the efficiency of data processing.

During the retrieval process, after the user enters query keywords, the system first vectorizes these keywords to generate a query vector. Then, the system uses the stored vectors in the vector database to find historical data vectors that are closest to the query vector through similarity calculation (such as cosine similarity). This process can quickly identify documents or records related to the user's needs.

To further improve the relevance of retrieval results, the system then adopts reranking technology. This technology performs secondary sorting on the results based on the initial retrieval, and optimizes the sorting order of retrieval results by introducing more contextual information and features (such as the importance of documents and historical retrieval frequency).

Specifically, reranking may use machine learning models to score the initial results, considering the relevance of documents to the query, the quality of documents, and the user's historical preferences comprehensively, which ensures that users can quickly find the information that best meets their needs when querying, thereby providing strong support for subsequent risk assessment and decision-making.

This knowledge document library provides support for subsequent data analysis and at the same time provides the system with historical context to help analyze current monitoring data more accurately. The historical data of the dam not only provides key references for the analysis of real-time monitoring data but also adds necessary historical context to the assessment process, making the dam safety assessment more comprehensive and accurate.

Module 4: hazard assessment module constructed based on the BIM model, mathematical models, physical models, and mathematical-physical hybrid models. It is used to assess the structural strength and stability of the dam based on real-time monitoring data and historical data, and obtain the location and type of hazards.

The mathematical models, physical models, and mathematical-physical hybrid models include finite element analysis models, fluid mechanics models, heat conduction models, and soil mechanics models.

The finite element analysis model is used to identify stress concentration areas through finite element analysis; the fluid mechanics model is used to identify areas that may suffer structural damage due to excessive water pressure or water erosion through fluid mechanics analysis; the heat conduction model is used to identify parts where temperature changes affect structural safety through thermal stress distribution analysis; the soil mechanics model is used to identify areas that may experience settlement or landslides through soil mechanics analysis.

Specifically, Module 4 constructs a BIM model of the dam based on engineering and technical documents, and extracts attribute data from it to assign to each structural unit; associates historical operating status data, maintenance records, stress history, and other information with the corresponding parts of the BIM model; integrates the latest technical standards, specifications, laws, regulations, accident cases, and academic research into the BIM model based on externally acquired information resources, and updates risk assessment parameters and hazard identification models;

Uses the geometric and material information of the BIM model to conduct finite element analysis, fluid mechanics analysis, heat conduction analysis, and soil mechanics analysis, simulates the response of the dam under various working conditions, and identifies potential hazard areas and their characteristics. These include stress concentration areas, areas that may be subjected to excessive water pressure or erosion, areas that may develop cracks due to excessive thermal stress, and foundation areas that may experience settlement or landslides;

Compares the identified hazard areas with historical operating status data and historical hazard records in engineering and technical documents to verify the accuracy of the model analysis results; classifies the identified historical hazards into risk levels based on the characteristics of historical hazards;

Highlights the identified hazard areas in the BIM model and labels the hazard characteristics; continuously updates the BIM model and various analysis models as new operating data and information resources are acquired.

By integrating BIM (Building Information Modeling) models, mathematical models, physical models, and hybrid models of mathematical and physical models, and combining internal monitoring data, external resource data, and historical data, Module 4 realizes the dynamic assessment of dam safety hazards. The core of this module is to integrate multiple models to provide comprehensive and scientific analysis results, and support the safety management and decision-making of the dam. Through the integration of these models, the system can obtain the dam's hazards and the locations where the hazards occur.

Module 5: hazard propagation path analysis module based on knowledge graph and graph database. It is used to construct a knowledge graph and graph database, analyze the correlation between dam structural nodes based on real-time monitoring data and historical data to identify associated hazards, and realize the analysis and early warning of dam hazard propagation paths, so as to obtain associated hazard information and hazard propagation paths.

Specifically, Module 5 defines each structural unit of the dam as a structural unit node and assigns attributes to it; defines the physical connections and mechanical relationships between structural units as structural connection edges and assigns attributes to them;

Establish the correlation between nodes and edges: establish edges between structural unit nodes based on historical operating status data, engineering and technical documents, and geometric information in the BIM model;

Store the information of nodes and edges in the graph database; calculate the nodes and edges in the graph database to obtain the connectivity and importance score of the nodes;

Based on the real-time collected dam operating status data and new external information resources, update the health status and risk level of nodes in the knowledge graph, as well as the weight and impact probability of edges;

Use the updated node and edge attributes and the results of connectivity calculation to analyze the path and probability of hazards propagating from one structural unit to another;

Based on the hazard propagation probability, construct a matrix representing the hazard correlation between nodes; combine the hazard impact matrix and the graph database to calculate the shortest path of hazards from the source node to other nodes; identify nodes that have an important impact on the hazard propagation process based on the importance score of the nodes and their role in the hazard propagation process.

Since the dam structure is composed of multiple interconnected components, anomalies in any node may trigger a chain reaction, thereby affecting the safety of the entire structure. The knowledge graph represents each structural unit of the dam and their mutual relationships in a graphical manner, enabling the system to clearly display the connections and influences between nodes. As the underlying support of the knowledge graph, the graph database can efficiently store and query complex structural information. By abstracting the structural units of the dam into nodes in the graph, the attributes of each node not only include basic physical information but also integrate multi-dimensional data such as historical hazard records, detection data, and maintenance logs. This integration of information enables the system to quickly retrieve relevant nodes and analyze possible associated hazards when a hazard occurs.

In addition, using the powerful path calculation capability of the graph database, the system can realize accurate analysis of the hazard propagation path. When an anomaly occurs in a certain node, the system can quickly calculate other nodes that may be affected by the hazard and identify the shortest path of hazard propagation.

Through the combination of the knowledge graph and the graph database, it is not only possible to systematically analyze the structural correlation of the dam but also to comprehensively identify potential associated hazards and their locations, providing more reliable data support and decision-making basis for ensuring dam safety. Through this multi-level analysis method, the dam monitoring system can realize efficient linkage from early warning to decision-making, ensuring the overall health and safety of the dam.

Figure 2:
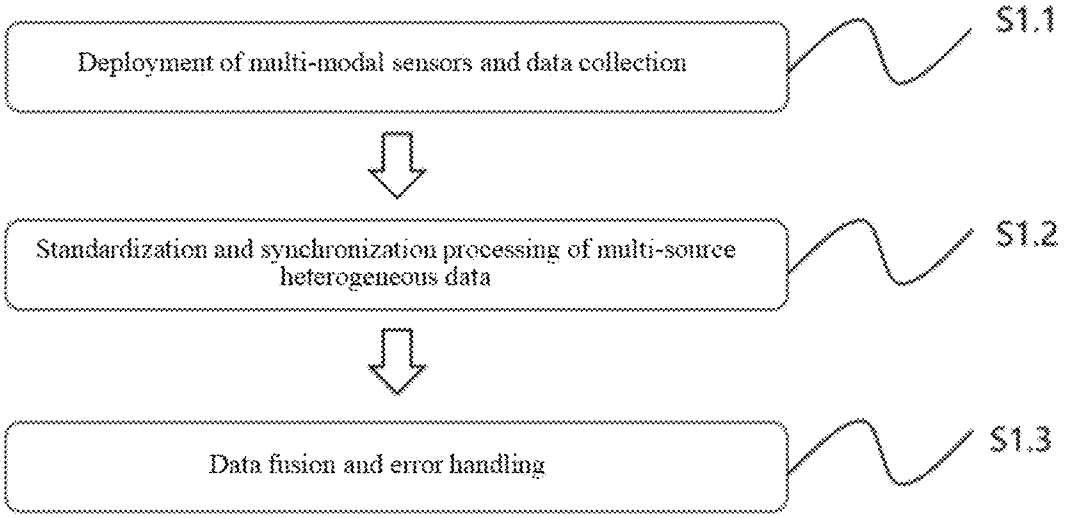
FIG. 2 is a flow chart for the collection and processing of multi-modal monitoring data inside the dam.

A method for analyzing the propagation path of dam safety hazards based on a knowledge graph, implemented by the above-mentioned approach, includes the following steps:

1) Collection and processing of multi-modal internal dam monitoring data, implemented by a real-time perception module for multi-modal internal dam monitoring data (Module 1). As shown in FIG. 2, the specific technical details and implementation methods are as follows:

1.1) Deployment of Multi-Modal Sensors and Data Collection

Multi-modal sensors include physical quantity sensors, vibration sensors, visual sensors, audio sensors, and environmental sensors to acquire multi-modal data. Physical quantity sensors include deformation sensors, seepage sensors, stress-strain sensors, temperature sensors, etc.; visual sensors include cameras, drones, etc.; environmental sensors include meteorological sensors, earthquake sensors, hydrological sensors, etc.

Real-time data acquired by multi-modal sensors is transmitted to a central processing system via a wireless network and stored in a unified database for data processing, data fusion, and analysis by the multi-modal large model.

1.2) Standardization and Synchronization Processing of Multi-Source Heterogeneous Data (1) Standardization processing can eliminate dimensional differences between different data, ensuring that data from different modalities can be compared and fused under the same dimension. The formula for data standardization is:

$$D_{norm} = \frac{D_i - \mu}{\sigma};$$

Wherein, $D_i$ is the original data from an i-th sensor, μ is the average value of the data from the i-th sensor, σ is the standard deviation of the data from the i-th sensor, and $D_{norm}$ is the value of the data from the i-th sensor after standardization. After standardization, all data are converted into standardized data with a mean of zero and a standard deviation of one, thereby ensuring the relative consistency between data from different sensors.

(2) Timestamp alignment: a spatiotemporal synchronization algorithm is used to align timestamps of data from different sensors, ensuring that all modal data are compared and analyzed under the same time dimension. The formula for time synchronization is:

$$T_{sync} = \frac{T_{i1} + T_{i2} + \ldots + T_{in}}{n};$$

Wherein, $T_{sync}$ is the synchronized timestamp, $T_i$ is the timestamp of each sensor, and n is the number of sensors. This algorithm ensures the consistency of data in the time dimension, especially in terms of time synchronization among vibration, audio, and visual data.

1.3) Data Fusion and Error Handling

A multi-modal weighted fusion method is adopted for fusing data from various sensors. The formula for data fusion is:

$$D_{fused} = \sum^{n} w_i D_i;$$

Wherein, $D_i$ is the data from the i-th sensor, and wi is the weight of the data from the i-th sensor. The system optimizes the fused data by adjusting the weight $w_i$ to make it more accurately reflect the actual state of the dam.

Errors may be introduced due to the measurement accuracy and transmission delay of different sensors. Therefore, an error calculation formula is used to evaluate the accuracy $E_f$ of data fusion:

$$E_f = \sqrt{\sum_{i=1}^{n} (w_i D_i - D_{fused})^2};$$

This formula is used to calculate the error value generated during the fusion of different modal data. If the fusion of data from a certain sensor with data from other sensors results in a large error, this module will dynamically adjust the data weight w; of that sensor to reduce the error and improve the accuracy of overall monitoring.

Figure 3:
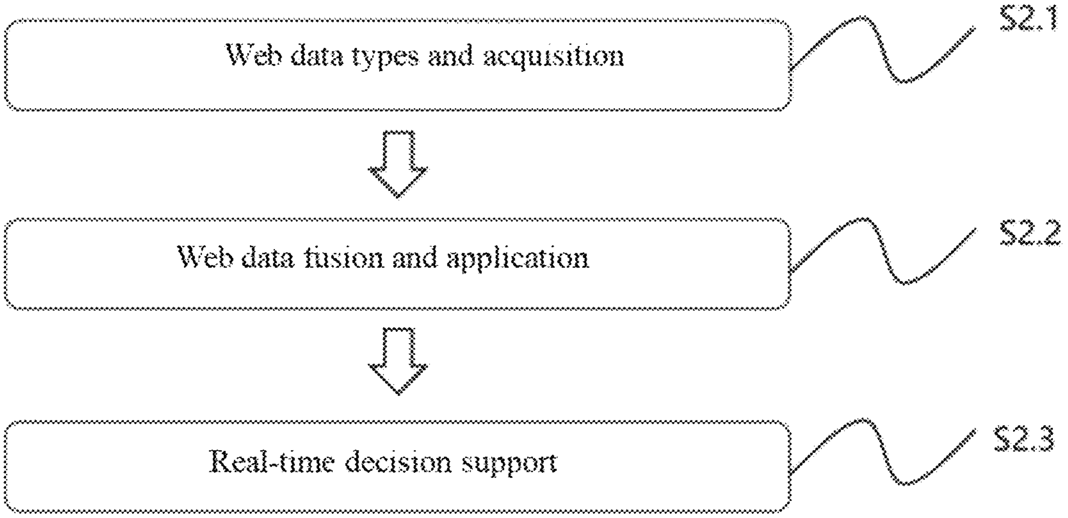
FIG. 3 is a flow chart for the collection and processing of external information resource data based on web search.

2) Acquisition of external resource data related to dam safety monitoring and assessment based on web search, implemented by a web search-based real-time perception module for external resource data (Module 2), which includes the collection and processing of external resource data based on web search, realized through automated web crawler technology. As shown in FIG. 3, the process of collecting and processing external resource data based on web search, with specific technical details and implementation methods as follows:

2.1) Web Data Acquisition, Including the Following Main Steps:

(1) Index establishment and retrieval: an inverted index structure is established, and a B+ tree index structure is adopted. The retrieved data are sorted based on factors such as relevance and timeliness to ensure that users obtain the most useful information. The formula for the ranking score is:

$$R(Q, P) = \alpha \cdot CTR + \beta \cdot \text{Relevance} + \gamma \cdot \text{Freshness}$$

Wherein, CTR is the click-through rate, Relevance is the relevance between information P and query Q, Freshness is the timestamp of information release, and α, β, γ are the weights corresponding to CTR, Relevance, and Freshness respectively. The click-through rate (CTR) is obtained by recording the number of impressions and user clicks of each search result. When a user performs a search, the system automatically counts these data to calculate the CTR value. Relevance can be determined through manual annotation, user feedback, and machine learning models. Experts evaluate the relevance of each document and make adjustments based on user click behavior and satisfaction feedback. In addition, machine learning models can automatically score by analyzing features. The acquisition of Freshness depends on the recorded timestamp, and the system evaluates the freshness of information based on the difference between the current time and the record creation time. Through these methods, the system can comprehensively judge the quality and relevance of each search result. With this ranking algorithm, the module can quickly acquire and utilize the latest information related to dam safety.

(2) Data caching and update: a caching mechanism is adopted, and cached data are updated regularly. To improve retrieval efficiency, a caching mechanism is used to cache frequently accessed data, such as specific standards and regulations, in local storage, reducing repeated queries; cached data are updated regularly to ensure data timeliness.

(3) Parallel query and distributed computing: a distributed index scheme is adopted to distribute external data across multiple servers or nodes for processing. During querying, tasks are assigned to multiple servers for parallel processing, thereby reducing the load pressure on a single server, shortening the query response time, and further improving query efficiency.

2.2) Web data fusion and application: by real-time acquisition of web data, such as global patent information, international standards, laws and regulations, and the latest academic papers, the system can combine these external data with internal sensor data. Firstly, external data provide the latest technical and regulatory references for dam safety assessment; secondly, sensor data provide real-time monitoring of the dam's health status. The system integrates these two types of data, analyzes potential risks and hazards, and generates a comprehensive assessment report to support intelligent decision-making and ensure the safe operation and management of the dam. For example: by real-time acquisition of global patent data, the system can identify the latest monitoring and reinforcement technologies, helping managers select appropriate technical solutions for dam maintenance. By retrieving international standards and laws and regulations, the system can help dam operators adjust operational processes to ensure compliance and reduce potential risks caused by non-compliance with standards. The latest academic papers and research results provide managers with rich background information to support scientific risk assessment and decision-making.

Figure 4:
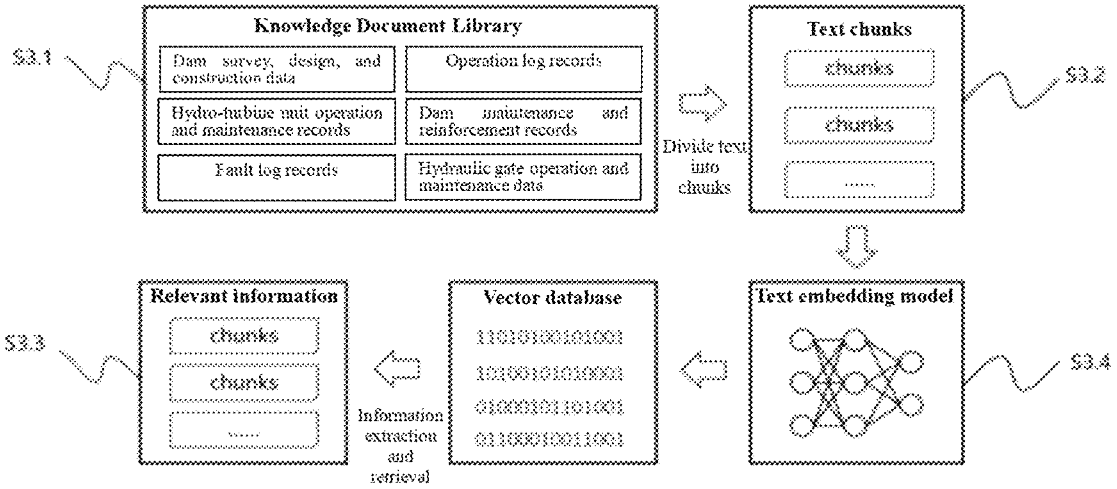
FIG. 4 is a flow chart for the preprocessing and retrieval of engineering and technical documents.

3) Acquisition of dam historical data, including the construction of a dam basic data knowledge base and efficient retrieval through a vector database, implemented by Module 3. As shown in FIG. 4, the specific technical details and implementation methods are as follows:

3.1) Construction of a dam basic data knowledge base. The dam basic data knowledge base includes dam survey, design, and construction data, daily dam operation data, operation log records, fault log records, hazard records, hydro-turbine unit operation and maintenance records, hydraulic gate operation and maintenance data, dam maintenance and reinforcement records, etc. These documents cover detailed information on all aspects of dam construction, operation, maintenance, and repair, forming an important foundation for the system's analysis and decision support.

3.2) Text chunking. Documents in the dam basic data knowledge base are divided into text chunks. A text chunk represents different chapters, paragraphs, or sentences of a document. The purpose of chunking is to divide long documents into smaller segments to facilitate subsequent processing and calculation, while maintaining semantic integrity to improve processing speed and data operability. Each text chunk contains meaningful semantic units, ensuring that subsequent information extraction steps can obtain high-quality and accurate content.

3.3) Text embedding. A text embedding model is used to process text chunks, converting them into digital vectors to obtain text chunk vectors. All text chunk vectors form a vector database. The semantic information of the text is represented through vectors, and the finally obtained vector database serves as a dam basic data knowledge base.

Text embedding is implemented through machine learning algorithms. Text embedding models include Word2Vec, GloVe, and deep learning-based BERT models. These models learn contextual relationships in large-scale corpora and map similar words or sentences to similar vector spaces. The closer the semantics of two text chunks are, the closer their distance in the vector space. Through text embedding, the system can capture subtle differences and hidden semantic information in the text, laying a foundation for information extraction and relevance analysis.

3.4) Information Extraction and Retrieval Based on the Vector Database.

Information extraction and retrieval are implemented through a nearest neighbor search algorithm, which can quickly find text chunk vectors closest to the query vector and return the corresponding original text content. Nearest neighbor search algorithms include k-nearest neighbor (k-NN) algorithms or approximate nearest neighbor (ANN) search algorithms.

In practical applications, this function can quickly find records or knowledge related to the current problem from massive documents. For example, if the system needs to check the maintenance records of a specific dam, it can extract maintenance and repair data related to that dam from the dam basic data knowledge base for risk assessment or decision support.

Figure 5:
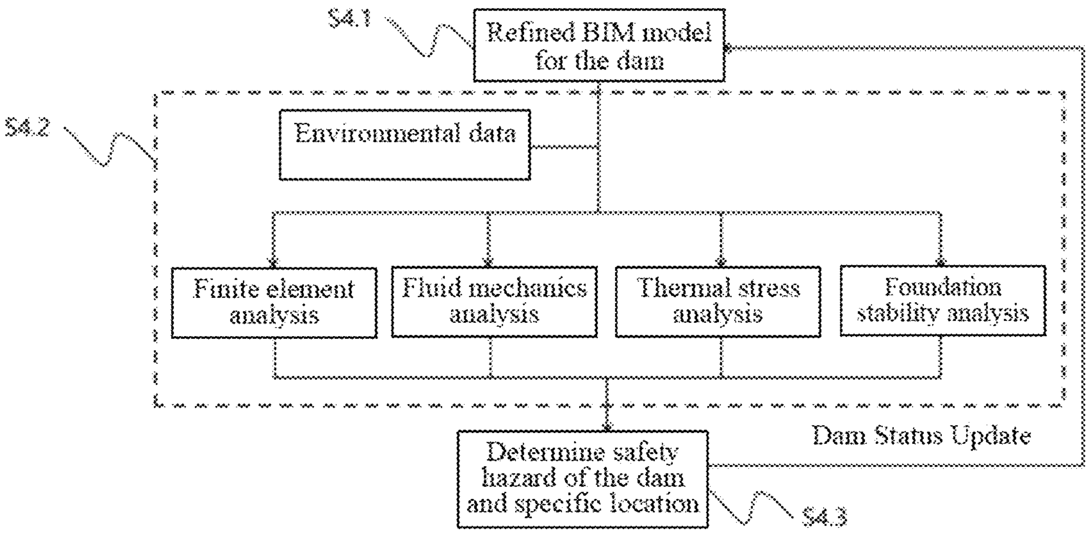
FIG. 5 is a flow chart for dam hazard assessment based on BIM models, mathematical models, physical models, and their hybrid models.

4) Dynamic assessment and analysis of dam safety hazards based on the aforementioned real-time monitoring data and dam historical data to determine the type and location of hazards, implemented by Module 4. As shown in FIG. 5, the specific technical details and implementation methods of the dam safety hazard assessment process are as follows:

4.1) Construction of a refined BIM (Building Information Modeling) model for the dam. The BIM model represents the dam's geometric information, material properties, construction history, and maintenance records through 3D visualization, providing accurate basic information for the analysis of mathematical models, physical models, and mathematical-physical hybrid models.

For example, the system can identify vulnerable parts of the dam or areas with historical maintenance records through the BIM model. These areas are often the focus of assessment and may have potential safety hazards.

4.2) Dam safety hazard analysis integrating mathematical models, physical models, and mathematical-physical hybrid models: by combining the calculation results of the BIM model with mathematical models, physical models, and mathematical-physical hybrid models, a comprehensive safety assessment of the dam is conducted, potential hazard areas are accurately located, and the type and location of hazards are determined.

Mathematical models, physical models, and mathematical-physical hybrid models include finite element models, fluid mechanics models, heat conduction models, and soil mechanics models.

The BIM model provides geometric information, material properties, historical records, and foundation data for the calculation of mathematical models, physical models, and mathematical-physical hybrid models. The 3D geometric structure of the BIM model is composed of multiple structural units. The geometric information (including volume, shape, and position) of each structural unit is discretized and transmitted to the finite element model, fluid mechanics model, and heat conduction model for analysis, which is used to improve the accuracy of simulation calculations. Material properties include the strength, elastic modulus, and thermal conductivity of concrete, which are used for the mechanical analysis of the dam. Historical records include the dam's historical maintenance records and stress history information, which are used to identify areas that have experienced stress concentration or have undergone repairs, thereby better judging whether these areas have repeated hazards.

Dam hazard types include but are not limited to stress concentration, water erosion, cracks caused by thermal stress, and foundation instability.

Stress concentration hazards: the finite element analysis model is used to simulate the stress and deformation distribution of the dam under different load conditions. The geometric information and material property data provided by the BIM model are discretized into multiple structural units, and the stress changes of these units under static loads (such as water pressure) and dynamic loads (such as earthquakes or floods) are calculated. Through stress tensor and deformation calculation, stress concentration areas are identified. These areas are often weak links in the structure and may cause cracks, deformation, or even failure. For example, when a certain part of the dam bears excessive pressure or stress, the finite element analysis model can identify this location and, combined with the historical records of the BIM model, determine whether it is outside the safety threshold.

Water erosion hazards: the fluid mechanics model is combined with the BIM model to analyze the dynamic impact of water flow on the dam. Based on the dam profile and boundary conditions provided in the BIM model, the fluid mechanics model simulates the interaction between water flow and the dam structure, and predicts areas that may suffer structural damage due to excessive water pressure or water erosion. The structural geometric information provided by the BIM model provides accurate boundary conditions for fluid mechanics analysis, enabling the fluid mechanics model to simulate real water flow behavior and thus more accurately identify areas sensitive to water pressure.

Temperature change hazards: the heat conduction model simulates the thermal stress distribution of the dam under different temperature conditions. Combined with the material properties and structural positions provided by the BIM model, it identifies material expansion or contraction caused by temperature changes. Under extreme temperature conditions (such as extremely cold or hot climates), dam materials will generate thermal stress, leading to cracks or deformation. By simulating and analyzing the stress distribution caused by temperature changes, the system can identify affected parts and judge their stability.

Foundation instability hazards: the soil mechanics model evaluates the stability of the dam foundation by analyzing the interaction between the dam and foundation soil. The foundation data provided by the BIM model are combined with the soil mechanics model to evaluate the bearing capacity and sliding risk of the foundation. By analyzing structural instability that may be caused by foundation settlement or sliding, potential hazards of the dam foundation are identified, especially areas where settlement, landslides, or collapses may occur, thereby ensuring the safety of the dam foundation. A common soil model is the Mohr-Coulomb model, which can evaluate the supporting effect of the soil on the dam and analyze the stability of the soil under extreme conditions.

4.3) Hazard Marking: hazards analyzed by the above-mentioned models are marked on the BIM Model, and the specific location of each hazard in the dam structure is determined.

The BIM model not only provides geometric and material information but also helps accurately locate the position of hazards through its 3D visualization function.

Hazard marking: when potential hazards are identified by mathematical models, physical models, and their hybrid models, these hazards are marked on the corresponding structural units of the BIM model. For example, when a stress concentration area is identified by finite element analysis, this area is highlighted with color on the BIM model, which can be used to quickly identify the hazard location.

Hazard location positioning: the specific location of the hazard in the dam structure is determined through the 3D BIM model. The 3D BIM model allows viewing of different areas of the dam from multiple perspectives and understanding the spatial distribution of hazards. Accurate positioning of hazard locations is ensured to facilitate on-site maintenance and handling.

Figure 6:
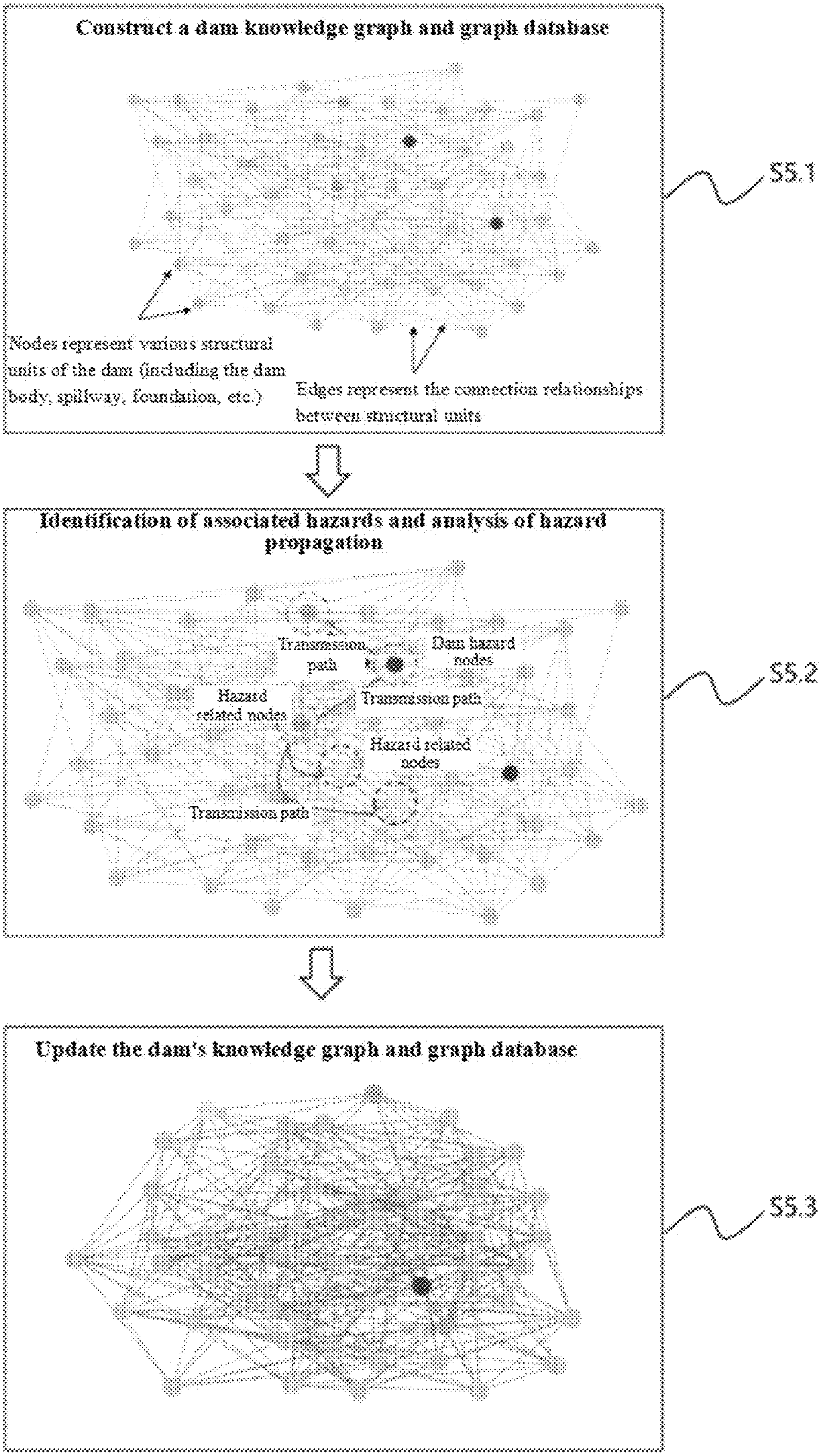
FIG. 6 is a flow chart for analyzing the propagation path of dam hazards based on knowledge graph and graph database.

5) Based on the dam's historical data and real-time monitoring data, identify associated hazards to track the propagation path of hazards within the dam, implemented by Module 5. As shown in FIG. 6, the process of analyzing the propagation path of dam hazards, with specific technical details and implementation methods as follows:

5.1) Construct a Dam Knowledge Graph and Graph Database.

Abstract the dam structure into a graph G=(V, E), wherein V is a set of nodes representing various structural units of the dam (including the dam body, spillway, foundation, etc.); E is a set of edges representing the connection relationships between structural units. Each node contains attribute information of the corresponding structure, such as historical detection data, material strength, and stress distribution. The attributes of node v are expressed as a vector: A(v)=[historical detection data, material strength, stress distribution]. Edges contain information about the physical connections of the structure and related attributes. The attributes of edge $e_{vj}$ connecting node v and node j are expressed as: $W(e_{vj})$=[material strength, force transmission relationship]. Hazard propagation relationships are dynamic attributes, closely related to the state of nodes (e.g., the probability of a hazard occurring) and the propagation weight of edges (e.g., hazard impact probability, hazard propagation intensity). Such information usually needs to be dynamically generated through real-time calculations or historical data analysis, rather than being fixed static attributes of edges. Therefore, only static attributes (material strength and force transmission relationship) are listed in the initial definition. In this embodiment, the main purpose of constructing edge attributes is to describe the physical and mechanical relationships between structural units to support basic structural analysis (e.g., stress transmission). Due to their high complexity, hazard propagation relationships may be divided into a separate calculation module instead of being treated as default static attributes of edges.

Store the set of nodes and edges in a graph database. The graph database efficiently manages structural data and provides basic information for subsequent hazard propagation analysis. This structured data storage method makes data query and analysis more efficient and enables the provision of accurate information in a short time. The graph database includes the set of nodes, the set of edges, and node connectivity used to represent the degree of association between a structural unit and other structural units.

The node connectivity LJ(v) is used to measure the relative importance of node v in the dam structure, specifically reflecting the degree of connection between this node and other structural units. By calculating the connectivity of node v, its position and role in the overall dam structure can be determined. A node with high connectivity means it is connected to multiple other nodes, indicating that the node may perform important functions or bear greater stress in the structure. The connectivity LJ(v) of node v can be expressed as:

$$LJ(v) = \sum_{j=1}^{n} A_{jv};$$

Wherein $A_{jv}$ is an element in an adjacency matrix, indicating whether node j is connected to node v, and n is the total number of nodes in the knowledge graph.

The adjacency matrix is a matrix used to represent the graph structure, which can clearly show the connection relationships between nodes. A node with high connectivity means it is in a key position in the dam structure and may have a significant impact on the overall safety of the dam.

The PageRank algorithm is used to evaluate the relative importance of each node in the dam. The calculation formula is:

$$PR(v)=\frac{1-d}{n}+d\sum_{u\in B_v}\frac{PR(u)}{L(u)};$$

Wherein PR(v) is the relative importance score of node v, $B_v$ is the set of nodes connected to node v, L(u) is the number of outgoing edges of node u, d is the damping factor (usually set to approximately 0.85), and n is the total number of nodes. This score helps the system identify key nodes in the dam structure; especially when the dam is subjected to stress or hazards, these key nodes may be the parts that require the most attention.

5.2) Identification of associated hazards and analysis of hazard propagation. Identify potential associated hazards near the hazard locations determined in step 4). The core of a knowledge graph is indeed composed of nodes and edges: nodes represent entities (such as the dam's structural units and hazards), and edges represent relationships between nodes (such as connections and influences). However, the richness and functionality of a knowledge graph are reflected not only in the connections between nodes and edges but also in the attribute information associated with nodes and edges.

Node attributes: each node can carry rich attribute information, such as historical detection data, material strength, and stress distribution. These attributes provide important context for understanding the characteristics and state of the node. For example, the material strength and historical detection data of a structural unit of the dam can help evaluate the safety of that unit.

Edge attributes: the attributes of edges describe the characteristics of relationships between nodes, such as force transmission relationships or connection strength. These attributes help analyze the mutual influence between different structural units; especially when a hazard occurs, understanding how forces are transmitted in the structure is crucial.

Information integration: the knowledge graph can integrate information from different sources, such as historical hazard records, maintenance logs, and expert recommendations. This information can be used as supplements to nodes and edges to help construct a more comprehensive hazard network. For example, the location of a hazard may be related to a specific state of a node in historical records, and this relationship can be described through edges in the knowledge graph.

Hazard propagation analysis: by analyzing the attributes of nodes, the characteristics of edges, and the attributes of edges, the knowledge graph can identify associations between hazards and track the propagation path of hazards within the dam. This propagation analysis relies not only on the connectivity of nodes and edges but also comprehensively considers attribute information to more accurately evaluate the impact of hazards on the entire structure.

Therefore, the value of the knowledge graph lies in its ability to provide in-depth understanding and analysis capabilities of complex structures through rich attribute information of nodes and edges, thereby effectively supporting hazard identification and propagation analysis.

To analyze hazard propagation, the system constructs a hazard impact matrix. The hazard impact matrix is a structured data table used to represent the hazard correlation between different structural units of the dam. In this matrix, rows and columns represent various nodes, and the value of each cell reflects the intensity or risk level of hazard propagation between two nodes. These values can be calculated based on factors such as historical hazard records, the material strength of nodes, and stress distribution. By analyzing the hazard impact matrix, managers can identify high-risk nodes and formulate timely prevention and repair measures accordingly, thereby effectively reducing potential risks and ensuring the safe operation of the dam. Through the analysis of this matrix, managers can identify high-risk nodes and take timely measures.

Calculate the shortest path based on the graph database to analyze the propagation path of hazards in the dam structure. The calculation formula for the shortest path is:

$$d(u,v)=\min\sum_{i=1}^{k}w(e_i);$$

Wherein d(u, v) represents the shortest path distance between node u and node v, w is the weight of edge $e_i$ on the path, and k is the number of edges on the path. In dam monitoring, the weight of edges is determined based on several key factors. First, physical distance is an important consideration: the shorter the distance between connected nodes, the lower the edge weight is usually set, as hazards are more likely to propagate over short distances. In addition, the intensity of force transmission also affects the weight: the higher the strength and stiffness of the connecting material, the greater the resistance to hazard propagation, and the corresponding weight can be set lower. Historical hazard data is also important: if a certain path has frequently experienced hazard propagation in the past, the edge weight should be adjusted lower to reflect higher risks. Environmental factors (such as rainfall and temperature changes) and material properties also affect weight setting. By comprehensively considering these factors, a reasonable weight can be set for each edge, making the shortest path calculation more accurate and ensuring the scientificity and effectiveness of hazard propagation analysis. The shortest path algorithm is used to calculate the probability and speed of hazards propagating from one node to other nodes.

In addition, the graph database supports complex path traversal queries, which can efficiently traverse relevant paths in the dam structure according to user-defined conditions and provide detailed information about the paths (such as the state of each node and the attributes of edges). Path traversal queries include the use of recursive traversal algorithms to query all paths P(u, v) between node v and node u, and evaluate the importance of the paths based on the edge weights w on the paths and node states. In hazard propagation analysis, node state refers to the health or safety status of each node at a specific time, reflecting its current safety and potential risks. Node states usually include safety levels, such as "safe", "warning", or "dangerous", which are evaluated through real-time monitoring data (e.g., stress, displacement, and temperature). In addition, if a node has been identified as having a hazard, its state will include the hazard type, severity, and possible impact range. Historical monitoring records and maintenance logs also affect the state of nodes; especially nodes that have experienced hazards in the past require more attention. Environmental factors, such as rainfall or earthquakes, can also affect node states and change their safety. By comprehensively evaluating node states, the system can effectively predict the risk of hazard propagation and provide an important basis for management decisions.

If a hazard occurs in a node, the system will calculate the impact of the hazard on its adjacent nodes and predict the possible scope of the hazard through a propagation model. The hazard propagation probability can be expressed by the following formula:

$$F(u, v) = P(u) \cdot \exp\left(-\frac{d(u, v)}{d_0}\right);$$

Wherein F(u, v) is the probability of a hazard propagating from node u to node v, P(u) is the probability of a hazard occurring in node u, d(u, v) is the shortest path distance between node u and node v, and do is the influence radius set by the system. This formula shows that the possibility of hazard propagation decreases as the distance between nodes increases. Based on the propagation prediction results, the system can trigger an early warning mechanism; especially when key nodes are threatened, the system will automatically issue a warning, prompting dam managers to conduct further inspections or take preventive measures.

The probability P(u) of a hazard occurring in node u can be obtained through multiple methods. First, historical data analysis is an effective approach: the probability is estimated by calculating the ratio of the frequency of past hazards in the node to the total number of monitoring times. In addition, real-time monitoring data can also provide important information: using data such as stress, displacement, and temperature monitored by sensors, combined with set safety thresholds, the health status of the node is evaluated to determine the possibility of a hazard occurring. Constructing statistical models is also a common method: hazard probabilities are predicted through various influencing factors (such as material properties and environmental conditions). Finally, expert evaluation can provide a basis for probability: in-depth analysis of node characteristics is conducted combined with professional knowledge. Through these methods, the system can dynamically update the probability of hazards occurring in nodes and provide accurate support for hazard propagation prediction.

5.3) Update the dam's knowledge graph and graph database. The data of nodes and edges in the knowledge graph and graph database are continuously incrementally updated as monitoring data is updated, implemented by an incremental update algorithm.

Update the state information of nodes, including structural health status and stress conditions based on real-time sensor data. At the same time, the attributes of edges are also dynamically adjusted; for example, if abnormal force transmission is found in certain areas during structural inspection, the weights of the corresponding edges are adjusted, and the shortest path and node importance are recalculated.

By introducing an incremental update algorithm, only the changed parts of nodes and edges are updated, which greatly improves the response speed and operational efficiency of the system.

In practical applications, dam hazard prediction and risk assessment can be carried out based on the calculation results obtained from the above steps, and then the alarms and thresholds of relevant sensors can be adjusted. The specific steps include the following:

6) Pre-training and fine-tuning of the multi-modal large model: pre-train and fine-tune the multi-modal large model to enable it to learn to obtain risk assessment results, early warning thresholds, and early warning response mechanisms based on the aforementioned real-time monitoring data, external resource data, dam historical data, hazard locations and types, and dam hazard propagation paths. The technical details and implementation methods of pre-training and fine-tuning the multi-modal large model are as follows:

6.1) Dataset construction and preprocessing.

Dataset construction: collect historical multi-modal monitoring data (from Module 1), external resource data (from Module 2), dam historical data (from Module 3), hazard locations and types (from Module 4), and hazard propagation paths (from Module 5). Based on the above data, form input samples: sensor data deployed on the dam, historical hazard records, engineering and technical documents formed during the planning, design, construction, and operation phases of the dam, information resources related to dam safety, geometric and material information of the BIM model, and timestamp and spatial location information.

Data preprocessing: including data cleaning (removing invalid data, noise, and outliers generated by sensor faults), format unification (e.g., equidistant processing of time-series data, vectorization of text data through word segmentation and keyword extraction), alignment and synchronization (achieving time synchronization of multi-modal data based on timestamps, and aligning sensor data with the BIM model through unified spatial coordinates), and normalization (adopting Min-Max Scaling for continuous data and one-hot encoding for categorical data).

Data labeling: create labels for each sample, including binary labels indicating whether a hazard event has occurred (0: not occurred, 1: occurred), probability values of hazard events (calculated by the ratio of the number of hazard occurrences to the total number of occurrences of specific conditions), and the type and impact degree of hazard events (used as auxiliary labels for event classification tasks). Among them, the data for calculating the data labels are obtained from dam historical data (from Module 3), hazard locations and types (from Module 4), and hazard propagation paths (from Module 5).

Data augmentation: when data is insufficient or imbalanced, data augmentation techniques can be used to improve the generalization ability of the model. These techniques include segmenting long time series into short time windows to extract more features, performing joint sampling on multi-modal data to generate new samples, and using simulation methods to generate synthetic samples of sensor data or hazard propagation paths. This enriches the diversity and completeness of the dataset.

Modal feature encoding: transformer models require serialized vectorized feature inputs. Therefore, feature encoding is performed on each type of modal data: For sensor data, sliding windows are used to extract time-series features; for visual data, pre-trained CNNs (such as ResNet or ViT) are employed to extract image features; for text data, pre-trained language models (such as BERT) are used to generate embedding vectors; for BIM model data, geometric and material properties are extracted and digitized; for spatiotemporal information, timestamps and spatial locations are encoded into numerical vectors. These features are processed separately by independent encoders, providing a foundation for the fusion of multi-modal features in the model.

Organizing data into Transformer input format: the Transformer architecture requires multi-modal features to be organized in a sequential form. Each sample forms a sequence, wherein each element corresponds to a feature vector of one modality (e.g., modality 1 feature, modality 2 feature, modality 3 feature, . . . , modality 1 feature, modality 2 feature, modality 3 feature, . . . , modality 1 feature, modality 2 feature, modality 3 feature, . . . ). A multi-head self-attention mechanism of the Transformer is used to fuse modal features and generate a joint representation with contextual relevance, laying the groundwork for the comprehensive analysis of multi-modal data.

Saving the training set: to facilitate efficient model training and validation, the training set needs to be saved in a format suitable for batch loading (e.g., .csv, .json, or .tfrecord) and divided according to specific rules. Typically, the data is split into a training set and a validation set using methods such as chronological order or random proportion. For example, 80% of the data is used for training and 20% for validation, ensuring the scientificity and accuracy of model training and evaluation.

6.2) Model Fine-Tuning and Pre-Training

Based on the dataset established above, the multi-modal large model fuses the features of each modality through the multi-head self-attention mechanism of the Transformer. Data from these different sources is aggregated into the Transformer model for joint analysis, enabling the model to provide information support from multiple dimensions when identifying hazards. Through the joint processing of multi-modal data, the system can comprehensively assess the dam's health status by combining abnormal audio signals with surface change information in images.

The loss function for pre-training the deep learning model based on the Transformer architecture is as follows:

$$L(\theta) = -\frac{1}{N}\sum_{i=1}^{N}[y_i \log(\hat{y}_i) + (1 - y_i)\log(1 - \hat{y}_i)];$$

Wherein, $y_i$ is the actual label, $\hat{y}_i$ is the model's predicted result, N is the total number of samples, and θ is the model parameter. This loss function is used to evaluate the difference between the model's predicted results and the actual results.

To reduce the model's loss value and optimize the model parameters, a gradient descent algorithm is introduced, with the formula as follows:

$$\theta_{new} = \theta_{old} - \eta\nabla_\theta L(\theta);$$

Wherein, θ is the learning rate, and $\eta\nabla_\theta L(\theta)$ is the gradient of the loss function with respect to the parameters. By continuously updating the model's parameter θ, the model is gradually optimized, enabling it to process and analyze dam monitoring data more accurately.

To prevent the model from overfitting during training, L2 regularization technology is introduced to maintain the model's generalization ability—ensuring the model can make accurate predictions even when facing unseen data. The formula is as follows:

$$L_{reg}(\theta) = L(\theta) + \lambda\sum_{i=1}^{n}\theta_i^2;$$

Wherein, λ is the regularization parameter, which is used to control the model's complexity and prevent the model from over-relying on training data.

6.3) Continuous learning and optimization of the model: through an online learning mode, the model is continuously updated using new monitoring data to maintain its sensitivity to environmental changes.

The key to online learning lies in the rapid response to new data and dynamic adjustment of model weights. For example, during floods or extreme weather events, the latest monitoring data is used to quickly update model parameters, enhancing the model's ability to respond to emergency situations. At the same time, the system's closed-loop feedback mechanism allows each prediction result to be compared with actual data, from which errors are identified and the model is adjusted—ensuring it maintains stable high performance during long-term monitoring.

During the continuous learning and optimization of the model, "error" refers to the difference between the model's predicted results and actual observed values. This difference can be quantified in multiple ways; for instance, prediction error is the deviation between the model's output for input data and the true label. Loss functions (such as mean squared error and cross-entropy, which are commonly used) are employed to comprehensively evaluate this error. In online learning, the system compares each model prediction result with the latest monitoring data through a closed-loop feedback mechanism to calculate feedback errors. This process not only helps adjust the model's weights and parameters but also decomposes the error into bias and variance to further optimize model performance. Through continuous monitoring and analysis of errors, the system can real-time improve its ability to respond to emergencies, ensuring scientific and effective decision support for dam safety management.

Through continuous optimization, the model's weights and parameters are constantly adjusted based on the latest data, ensuring it can always provide scientific and effective decision support for dam safety management under various complex environments.

7) Comprehensive early warning and response for dam safety based on the multi-modal large model: input real-time monitoring data, hazard types and locations, dam historical data related to hazards, hazard propagation paths within the dam, and external resource data related to hazards into the pre-trained multi-modal large model. Conduct analysis based on dam historical data and real-time external resource data to obtain the dam's hazard occurrence probability, hazard impact degree, and early warning threshold-thereby outputting risk assessment results and an early warning response mechanism.

The specific technical details and implementation methods of the comprehensive early warning and response mechanism for dam safety based on the multi-modal large model are as follows:

7.1) By integrating real-time monitoring data, external resource data, and historical data, the multi-modal large model predicts the dam hazard occurrence probability ($P_{failure}$), and further calculates the potential impact degree ($C_{impact}$) of the dam hazard, thereby generating the final risk assessment result.

(1) Hazard occurrence probability ($P_{failure}$): the multi-modal large model uses real-time monitoring data from multi-modal sensors (including information such as water flow pressure, vibration, temperature, and displacement) to analyze the current structural state of the dam.

These data reflect the dam's operating conditions under different environmental conditions and provide rich feature vectors for the multi-modal large model. Through deep learning algorithms, the multi-modal large model can identify potential hazards and calculate their occurrence probability ($P_{failure}$). In addition to real-time monitoring data from internal sensors, the multi-modal large model also fully utilizes external resource data and dam historical data to improve prediction accuracy. Through comprehensive analysis of these multi-dimensional data, the model can more accurately determine the hazard occurrence probability caused by dam maintenance records and other factors, and dynamically adjust the value of $P_{failure}$.

External resource data is obtained through web searches, providing cutting-edge references for the risk prediction of the multi-modal large model. For example, the analysis of global accident cases can help the multi-modal large model identify hazard scenarios similar to the dam's current situation, thereby adjusting $P_{failure}$ more accurately.

Dam historical data comes from the dam basic data knowledge base constructed by RAG (Retrieval-Augmented Generation). By analyzing historical records, the multi-modal large model can capture the dam's long-term operation trends, maintenance history, and hazard distribution, and combine these data to predict the current hazard occurrence probability. For instance, if historical records show that hazards have occurred multiple times in certain areas, the multi-modal large model can increase the hazard occurrence probability ($P_{failure}$) for these areas.

(2) Impact Degree ($C_{impact}$): the multi-modal large model evaluates the potential consequences of risks by assessing the impact degree ($C_{impact}$) of dam hazards. $C_{impact}$ depends not only on the hazard occurrence probability but also on the degree of threat the hazard poses to key parts of the dam. By analyzing historical hazard records and dam maintenance data, the multi-modal large model calculates the potential damage caused by each type of hazard. The calculation formula for $C_{impact}$ is:

$$C_{impact} = \sum_{i=1}^{n} (I_i \times P^i_{failure});$$

Wherein, $I_i$ represents the impact degree of the i-th type of hazard event on the dam, $$P^i_{failure}$$

is the occurrence probability of this type of hazard event, and n is the number of hazard event types. This formula integrates the risk levels of multiple hazards and assigns different weights to each hazard. Based on factors such as structural damage, economic losses, and ecological impacts that may be caused by these hazards, the model derives a comprehensive impact degree value. By quantifying the impact of various hazards, managers can make advance preparations for prevention and response.

(3) Comprehensive risk score (R): the comprehensive risk score (R) is obtained by combining the hazard occurrence probability ($P_{failure}$) and impact degree ($C_{impact}$):

$$R = \alpha P_{failure} + \beta C_{impact}$$

Wherein, $\alpha_P$ is the weight of the hazard occurrence probability ($P_{failure}$), and $\beta_c$ is the weight of the impact degree ($C_{impact}$). The weights $\alpha_P$ and $\beta c$ can be obtained through multiple methods. First, expert experience and industry standards can be used to initially set the weight values to ensure their rationality. Second, user feedback and opinions from managers are collected to understand the importance of hazard occurrence probability and impact degree for decision-making in practical operations, and make corresponding adjustments accordingly. In addition, through A/B testing, different weight combinations can be used in different scenarios, and their effects can be compared to find the optimal configuration. Using machine learning models is also an effective method—training models to automatically optimize weights to better meet practical needs. Finally, statistical analysis of historical data can help evaluate the changing trends of hazard occurrence probability and impact degree, thereby providing data support for weight setting. Through these methods, the comprehensive risk score will be more accurate and can provide effective decision support for dam safety management.

The output of the multi-modal large model directly affects the final value of the comprehensive risk score (R), thereby providing data support for dam risk management. In this way, managers can gain a more comprehensive understanding of potential risks and formulate reasonable risk response strategies accordingly. For example, when the R value is high, the system may recommend increasing monitoring frequency, strengthening dam maintenance, or preparing emergency measures.

By analyzing multi-modal data, the multi-modal large model calculates the hazard occurrence probability and impact degree, providing accurate and intelligent support for dam safety risk assessment. The comprehensive risk score generated by the system not only helps identify potential hazards but also provides a scientific basis for dam managers to ensure timely and reasonable risk response strategies.

7.2) Triggering of dam safety risk early warning: by comprehensively analyzing internal sensor data, external resource data, and historical data, the multi-modal large model dynamically adjusts the early warning threshold. The specific adjustment mechanism is as follows:

(1) Threshold adjustment based on model output: when the multi-modal large model predicts that the occurrence probability ($P_{failure}$) of a certain type of hazard exceeds a set threshold (e.g., 70%), the system will proactively lower the alarm threshold of sensors related to this hazard to improve monitoring sensitivity. The magnitude of the reduction is determined by the extent to which the hazard occurrence probability exceeds the set threshold. For example, for every 5% increase in the hazard occurrence probability beyond the threshold, the alarm threshold of the relevant sensors is lowered by 2% to 5%. Specifically, when the hazard occurrence probability is high, the threshold is lowered; when the hazard occurrence probability is low and the external environment is stable, the threshold can be moderately increased to reduce false alarms. For instance, if the model predicts that the structural stress hazard occurrence probability in a certain area reaches 80% (exceeding the set threshold by 10%), the system will lower the alarm threshold of the stress sensors in that area by 5% to 10% to more sensitively capture stress changes.

(2) Threshold adjustment in response to external environmental data: when external environmental forecasts (such as heavy rain, earthquakes, etc.) indicate potential impacts on the dam, the system dynamically adjusts the alarm thresholds of relevant sensors based on the degree of environmental impact. In the case of expected heavy rain, the system lowers the alarm thresholds of seepage sensors and water level sensors; the magnitude of the reduction can be adjusted according to the rainfall level (moderate rain, heavy rain, downpour), for example, by 5% to 15%. In the case of earthquake early warnings, the system adjusts the alarm thresholds of ground stress and vibration sensors based on the earthquake magnitude and the distance between the epicenter and the dam. The larger the magnitude and the closer the distance, the greater the threshold reduction—possibly by 10% to 20%. By lowering the threshold, the sensitivity of sensors to anomalies caused by external environmental changes is improved, ensuring that potential risks can be detected in a timely manner.

(3) Threshold optimization based on historical data: the system regularly analyzes the deviation between sensor data and historical hazard records, and dynamically adjusts the early warning threshold. When the data of a certain sensor triggers an alarm multiple times when it is 5% to 10% higher than the set threshold, the system determines that the current threshold may be too sensitive or insufficiently sensitive. Based on the degree of deviation, the threshold is appropriately increased or decreased, with the adjustment range generally between 5% and 10%. For example, if historical data shows that the incidence of a certain type of hazard increases under specific environmental conditions (such as continuous high temperatures), the system will lower the threshold of relevant sensors during this period to improve monitoring sensitivity.

(4) Threshold anomaly detection and adaptive optimization: the system uses anomaly detection algorithms to dynamically adjust the early warning threshold by real-time monitoring changes in sensor data. When sensor data shows abnormal fluctuations (such as sharp changes in a short period) that do not conform to historical trends, the system identifies this as an anomaly. If the anomaly persists for more than a preset time (e.g., 30 minutes), the system appropriately adjusts the threshold by 5% to 10% based on historical data and external information. When data anomalies are caused by equipment aging or external interference, the threshold is adjusted to avoid false alarms or missed alarms.

(5) Comprehensive evaluation and threshold adjustment: the system can set different weights for the above adjustment mechanisms respectively, comprehensively considering the hazard occurrence probability output by the model, external environmental changes, and historical data, and determine the direction and magnitude of threshold adjustment through weighted calculation. In high-risk scenarios—when the hazard occurrence probability is high and the external environment is unfavorable—the threshold is lowered by up to 20%, and the monitoring frequency is increased. In low-risk scenarios—when the hazard occurrence probability is low and the environment is stable—the threshold can be moderately increased by 5% to 10% to reduce false alarms and improve system efficiency. The threshold adjustment is directly based on the hazard occurrence probability output by the model: the higher the probability, the more the threshold is lowered, and the more sensitive the monitoring system becomes. This dynamic adjustment mechanism ensures the accuracy and flexibility of the early warning system.

7.3) Dam safety risk early warning response mechanism: the dam safety risk early warning response mechanism is a key system that enables managers to quickly take effective response measures when the dam faces potential risks. This mechanism relies on the output of the multi-modal large model, combines external resource data and dam historical data, and provides accurate and dynamic early warning response strategies for dam management. By using the web search function to obtain the latest global standards and specifications, academic papers, laws and regulations, and leveraging the dam basic data knowledge base constructed based on RAG technology, the system can establish a comprehensive early warning response mechanism, ensuring the scientificity and timeliness of decision-making.

By analyzing the latest technical standards and specifications retrieved by Module 2, the multi-modal large model ensures that dam monitoring and emergency strategies comply with international standards. For example, updates to emergency response requirements for floods and earthquakes, as well as installation requirements for monitoring equipment, are promptly integrated into the early warning mechanism. This helps managers adjust emergency measures in accordance with these standards, ensuring their compliance and scientific validity. Academic research provides the latest achievements in dam risk assessment, structural reinforcement, and other fields, supporting managers in formulating more scientific protection plans and enhancing the effectiveness of emergency measures. Additionally, the system can acquire the latest laws and regulations, ensuring that dam managers adhere to relevant legal provisions during emergency responses such as disaster early warning and evacuation, thereby avoiding legal risks.

Based on historical maintenance and reinforcement records, the multi-modal large model identifies high-risk areas and prioritizes monitoring of these weak parts during emergencies. Hazard logs and operation logs assist the system in analyzing past hazards and their handling methods, thereby providing response strategies for early warning responses. For instance, if certain areas have experienced hazards under similar environmental conditions in the past, the multi-modal large model will propose corresponding emergency plans based on historical data-such as increasing monitoring frequency or implementing preventive reinforcement. This ensures that managers can quickly take targeted actions and reduce potential losses.

By combining external resource data obtained through the web search function and dam historical data provided by the RAG knowledge base, the multi-modal large model ultimately forms a comprehensive risk early warning and response mechanism. When the dam faces risks, the system can provide accurate early warning signals and, by integrating standards and specifications, academic research, laws and regulations, as well as historical maintenance and reinforcement data, offer managers comprehensive decision support for emergency responses.

This mechanism ensures that managers can not only formulate emergency plans based on the latest standards, specifications, laws, and regulations but also identify high-risk areas and hazard propagation paths by leveraging the dam's historical operation data, thereby formulating precise protection strategies. In emergency situations, the system can dynamically adjust response plans based on real-time analysis of multi-source data, ensuring the scientific validity, timeliness, and compliance of emergency measures, and effectively safeguarding the safety and reliability of the dam.

Content not described in detail in this specification belongs to the prior art well-known to those skilled in the art.

What is claimed is:

1. A computer-implemented method for detecting and mitigating structural risk propagation in a physical dam infrastructure based on a digital knowledge graph database, comprising the following steps:

conducting a historical structural safety hazard assessment of the physical dam infrastructure based on historical operating status data of the dam, externally acquired telemetry information resources related to dam safety, and engineering and technical physical documents formed during planning, design, construction, and operation phases of the dam, to identify physical historical hazards and engineering characteristics thereof;

constructing a digital knowledge graph database based on results of the historical structural safety hazard assessment, and representing physical structural units of the dam, the physical historical hazards, and mechanical relationships thereof in a form of digital node entities and structural connection edges;

updating node physical attributes and boundary mechanical relationships of the digital knowledge graph database based on real-time sensor operating status data collected from the physical dam infrastructure, and utilizing the updated digital knowledge graph database to analyze a critical propagation path of structural risk propagation of the dam;

wherein the process of conducting the historical structural safety hazard assessment on the dam and identifying the physical historical hazards and engineering characteristics thereof includes:

constructing and updating a localized BIM model: constructing a localized Building Information Modeling (BIM) model of the dam based on the engineering and technical physical documents, and extracting spatial geometry and material attribute data therefrom to assign to each of the physical structural units; associating the historical operating status data, physical maintenance records, and physical stress history information with corresponding spatial geometric coordinate parts of the localized BIM model; integrating latest technical engineering standards, specifications, laws, regulations, dam accident case histories, and academic research into the localized BIM model based on the externally acquired telemetry information resources, and updating physical risk assessment parameters and hazard mechanical identification models;

identifying physical historical hazards using the localized BIM model: utilizing spatial geometric and material mechanical information of the localized BIM model to execute a suite of multi-physics engineering simulations comprising at least one of finite element analysis, fluid dynamics analysis, thermal conduction analysis, and soil mechanics analysis, simulating a physical structural response of the dam under varying operational loads, and identifying potential physical hazard zones and geometric characteristics thereof, including localized stress concentration zones, zones subjected to excessive physical water pressure or hydraulic erosion, zones prone to physical cracks due to excessive thermal stress, and foundation zones susceptible to physical settlement or landslides;

hazard verification and physical risk assessment: comparing the identified physical hazard zones with the historical operating status data and historical hazard records within the engineering and technical physical documents to verify accuracy of multi-physics simulation analysis results; and classifying the identified physical historical hazards into technical risk levels based on physical characteristics of the historical hazards;

spatial visualization and model dynamic update: three-dimensionally highlighting the identified physical hazard zones within the localized BIM model and labeling physical response characteristics of the hazards; and continuously and dynamically updating the localized BIM model and various multi-physics analysis models as new physical operating data and telemetry information resources are acquired;

wherein the process of constructing and updating the digital knowledge graph database and analyzing the critical propagation path of the structural risk propagation of the dam includes:

definition and attribute assignment of physical nodes and structural edges: defining each of the physical structural units of the dam as a physical node entity and assigning attributes thereto, wherein the node attributes include: basic physical mechanical information, historical hazard records, sensor detection data, and physical maintenance logs; and defining physical contact connections and structural mechanical interactions between the digital node entities as structural connection edges and assigning attributes thereto;

establishing spatial correlation between physical nodes and structural edges: establishing the structural connection edges between the digital node entities based on the historical operating status data, the engineering and technical physical documents, and the spatial geometric information in the localized BIM model;

data storage and topology connectivity calculation: storing information of the digital node entities and the structural connection edges into a graph database; and executing calculations on the digital node entities and the structural connection edges within the graph database to obtain a topology connectivity and a structural importance score of the digital node entities;

digital knowledge graph dynamic update: updating a health status and a physical risk level of the digital node entities in the digital knowledge graph database, as well as an edge weight and an impact probability of the structural connection edges based on the real-time sensor operating status data collected from the physical dam infrastructure and new external telemetry information resources;

hazard physical propagation analysis and update: utilizing the updated attributes of the digital node entities and the structural connection edges, and results of the topology connectivity calculation to analyze a physical path and probability of hazards propagating from one physical structural unit to another physical structural unit; and constructing a structural risk propagation matrix and identifying critical physical nodes:

constructing a structural risk propagation matrix representing hazard correlation between the digital node entities based on the hazard physical propagation probability; combining the structural risk propagation matrix and the graph database to calculate a shortest physical path of hazards from a source physical node entity to other digital node entities by executing a shortest-path graph traversal constrained by the structural risk propagation matrix; identifying critical physical structural nodes having a decisive structural impact during hazard physical propagation based on the structural importance score of the digital node entities and mechanical roles thereof in the hazard physical propagation; and generating a control signal to actuate an engineering mitigation measure at a structural node identified along the identified critical propagation path.

2. The method according to claim 1, wherein the historical operating status data and the real-time sensor operating status data of the dam comprise data collected by physical quantity sensors, vibration sensors, visual sensors, audio sensors, and environmental sensors deployed on the physical dam infrastructure.

3. The method according to claim 1, wherein the externally acquired telemetry information resources comprise news reports, academic papers, patent data, technical standards, specifications, laws, and regulations related to dam safety.

4. The method according to claim 2, wherein the historical operating status data and the real-time sensor operating status data of the dam are preprocessed before subsequent steps, the preprocessing process comprising: applying normalization formulas to eliminate dimensional differences across varying types of data sensors; performing timestamp alignment on data from different sensors; fusing the data from the different sensors according to determined weights; and dynamically adjusting the determined weights during the data fusion based on measured sensor errors.

5. The method according to claim 2, wherein the process of externally acquiring the telemetry information resources related to dam safety comprises: acquiring a massive volume of external resource data via network searching and data scraping; building inverted indexes and B+ tree indexes for the external resource data; retrieving target data from the external resource data using the inverted indexes, the B+ tree indexes, and parallel query techniques; caching high-frequency access data sources and query results; and performing weighted fusion on the target data and the real-time sensor operating status data, and dynamically adjusting fusion weights according to data characteristics to generate a comprehensive telemetry information resource dataset.

6. The method according to claim 1, wherein the engineering and technical physical documents formed during the planning, design, construction, and operation phases of the dam are preprocessed before subsequent steps, the preprocessing process comprising: constructing a knowledge document repository based on the engineering and technical physical documents formed during the planning, design, construction, and operation phases of the dam; partitioning long documents within the knowledge document repository into discrete text chunks; converting the discrete text chunks into numerical vectors using a text embedding model to capture semantic information of text, thereby forming a vector database; and utilizing the vector database to retrieve text chunks related to a query to provide contextually relevant engineering information.

7. A system for detecting and mitigating structural risk propagation in a physical dam infrastructure based on a digital knowledge graph database, comprising a processor and a memory storing instructions that, when executed by the processor, configure the system to implement the method according to claim 1, the system comprising: a historical hazard identification module, a digital knowledge graph construction module, and a hazard propagation path analysis module;

the historical hazard identification module is configured to conduct a historical structural safety hazard assessment of the physical dam infrastructure based on historical operating status data of the dam, externally acquired telemetry information resources related to dam safety, and engineering and technical physical documents formed during planning, design, construction, and operation phases of the dam, to identify physical historical hazards and engineering characteristics thereof;

the digital knowledge graph construction module is configured to construct a digital knowledge graph database based on results of the historical structural safety hazard assessment, and represent physical structural units of the dam, the physical historical hazards, and mechanical relationships thereof in a form of digital node entities and structural connection edges; and the hazard propagation path analysis module is configured to update node physical attributes and boundary mechanical relationships of the digital knowledge graph database based on real-time sensor operating status data collected from the physical dam infrastructure, and utilize the updated digital knowledge graph database to analyze a critical propagation path of structural risk propagation of the dam and generate a control signal to actuate an engineering mitigation measure.

8. A non-transitory computer-readable storage medium storing a computer program thereon, wherein the computer program, when executed by a processor, implements the method for detecting and mitigating structural risk propagation in a physical dam infrastructure based on a digital knowledge graph database according to claim 1.

* * * * *